Patented June 6, 1950

2,510,908

UNITED STATES PATENT OFFICE 2,510,908

ADHESIVE FOR POLYSTYRENE

Frank J. Schubert, Midland, Mich., and Theodore O. Anderson, Joplin, Mo., assignors to The Dow Chemical Company, Midland, Mich., a corporation of Delaware No Drawing. Application March 3, 1947, Serial No. 732,132

3 Claims. (Cl. 260—30.6)

This invention relates to an improved adhesive for bonding surfaces of polymonovinylaromatic resins to like resins or to other solids.

The requirements of a satisfactory adhesive for bonding polystyrene or a related resin to itself or to another solid are numerous. To be useful in commercial operations, the adhesive must withstand storage before use, must be easily applied, and must dry rapidly, without requiring heating, to form a water-resistant joint. It should be effective in both low- and high-pressure bonding to produce a union of high strength. In addition, in making many articles, the joint must be water-white and transparent and should remain so without crazing for the life of the article. No adhesive having these qualities has heretofore been available.

It is therefore the principal object of the present invention to provide an improved adhesive which exhibits, to a very considerable degree, all the desirable characteristics mentioned.

The adhesive of the present invention is of the volatile solvent-plasticized resin type. Essentially it consists of a polymonovinylaromatic resin and a lesser proportion of a liquid triarylphosphate containing at least one xenyl group per molecule, both dissolved in a chloroaliphatic hydrocarbon having a boiling point between 75° and 150° C., the latter being the major component of the composition.

In so far as known, any polymonovinylaromatic resin may be used in the adhesive, it being preferable, though not essential, to employ the same resin as that forming the articles to which the adhesive is most likely to be applied. Polystyrene is the usual choice, although other polymonovinylaromatic resins, particularly polymethylstyrene, polyethylstyrene, polychlorostyrene, polydichlorostyrene, and polyvinylnaphthalene are also operable. In general, a solid polymer having a moderately high molecular weight is most desirable. In the case of polystyrene, a molecular weight corresponding to a viscosity at 25° C. of 75 to 85 centipoises for a 10 percent solution of the polymer in toluene is preferred.

The plasticizer component of the adhesive is a triarylphosphate containing at least one xenyl group per molecule and liquid at ordinary temperatures. Diphenyl mono-othoxenyl phosphate and monophenyl di-othoxenyl phosphate are most satisfactory, although other phosphates, e. g. mono-orthotolyl di-paraxenyl phosphate, diparaethylphenyl mono-paraxenyl phosphate, etc. may also be used.

The solvent portion of the adhesive is a chloroaliphatic hydrocarbon having a normal boiling point between about 75° and about 150° C. With boiling points much below 75° C., the solvent is too volatile for convenient use and may cause crazing of the resinous pieces to be joined. With a solvent boiling above 150° C. drying time of the adhesive is excessive. Ethylene dichloride and tetrachloroethylene are preferred, the latter being particularly good because of its low toxicity. However, carbon tetrachloride, 1.1.2 trichloroethane, sym. and uns. tetrachloroethane, propylene dichloride, propylidene dichloride, etc. are also effective.

As already mentioned, the chloroaliphatic hydrocarbon solvent should, to produce an acceptable adhesive, constitute a major proportion, i. e. more than half, of the composition. In general, a proportion of from 65 to 80 percent is best. The polymonovinylaromatic resin should be present in a proportion exceeding that of the triarylphosphate, a ratio of about two of resin to one of plasticizer being perhaps most effective.

The adhesives of the invention are prepared by mixing the essential components in the proportions stated and agitating to form a solution. The resulting material may be stored in closed containers for long periods without loss of effectiveness.

In use, the adhesive is applied at room temperature to the polymonovinylaromatic resin surface, and the wetted surface is pressed into contact with the solid to which it is to be bonded. The joint is then allowed to dry, usually for from 5 to 30 minutes, and is protected against strain during drying.

The new adhesive is effective in joining polystyrene or other polymonovinylaromatic resin to itself or to a surface of wood, metal, paper, cloth, glass, rubber, or other solid. It is of course, essential that the surfaces be clean. In bonding to rubber, the strongest joints are obtained when the rubber surface is pretreated with concentrated sulfuric acid for a few minutes, washed, and dried, before the adhesive is applied.

The following examples will further illustrate the invention.

Example 1

An adhesive was prepared by dissolving 16 parts of polystyrene (having a molecular weight corresponding to a viscosity at 25° C. in 10 percent solution in toluene of about 75 centipoises) and 8 parts of monophenyl di-orthoxenyl phosphate in 76 parts of ethylene dichloride.

This adhesive was applied to injection-molded polystyrene test blocks, 3.0 x 1.0 x 0.2 inches, which were pressed against like blocks in butt joints on the 0.2 x 1.0 inch section. The resulting pieces were then allowed to dry for 30 minutes in clamps at various pressures. The strengths of the joints so produced were then measured on a tensile test machine. With a clamping pressure of 16.5 pounds per square inch, joint strengths of 985 to 1175 p. s. i. were obtained. At 33 p. s. i. pressure, the corresponding values were 1390 to 2090 p. s. i., and at 50 p. s. i. clamping pressure, the strengths were 1700 to 2475 p. s. i. Test pieces soaked for 24 hours in water showed no change. After storage for several months, the joints remained clear, colorless, and free of objectionable crazing.

The same adhesive was used to bond polystyrene test pieces to wood, paper, brass, magnesium-base alloy, cast iron, stainless steel, and rubber. In all cases a mechanically strong bond was obtained.

*Example 2*

An adhesive was prepared by dissolving 16 parts of polystyrene and 8 parts of diphenyl mono-orthochloroxenyl phosphate in 76 parts of tetrachloroethylene. This material was tested in a manner similar to that in Example 1, and closely similar results were obtained.

In the foregoing specification and following claims, all proportions given are by weight.

What is claimed is:

1. An adhesive composition for bonding polystyrene to solids consisting of about 16 percent of polystyrene, about 8 percent of monophenyl di-orthoxenyl phosphate, and about 76 percent of ethylene dichloride.

2. An adhesive composition for bonding polymonovinylaromatic resins to solids consisting of a polymonovinylaromatic resin and about one-half by weight thereof of a liquid triarylphosphate containing at least one and not more than two xenyl radicals per molecule, both dissolved in a chloroaliphatic hydrocarbon having a boiling point between 75° and 150° C., the latter constituting more than half of the composition.

3. A composition according to claim 2 wherein the polymonovinylaromatic resin is polystyrene.

FRANK J. SCHUBERT.
THEODORE O. ANDERSON.

REFERENCES CITED

The following references are of record in the file of this patent:

UNITED STATES PATENTS

| Number | Name | Date |
|---|---|---|
| 2,207,623 | Kauppi et al. | July 9, 1940 |
| 2,285,570 | Cummins et al. | June 9, 1942 |
| 2,391,092 | Horback | Dec. 18, 1945 |